US009120573B2

(12) United States Patent
Ehlers et al.

(10) Patent No.: US 9,120,573 B2
(45) Date of Patent: Sep. 1, 2015

(54) SANITARY MODULE ARRANGEMENT FOR INSTALLATION IN AN AIRCRAFT CABIN

(71) Applicant: AIRBUS OPERATIONS GMBH, Hamburg (DE)

(72) Inventors: Bernd Ehlers, Hamburg (DE); Mark Herzog, Barsbuettel (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/627,759

(22) Filed: Sep. 26, 2012

(65) Prior Publication Data

US 2013/0082140 A1    Apr. 4, 2013

Related U.S. Application Data

(63) Continuation of application No. PCT/EP2011/001517, filed on Mar. 25, 2011.

(60) Provisional application No. 61/317,785, filed on Mar. 26, 2010.

(30) Foreign Application Priority Data

Mar. 26, 2010   (DE) .......................... 10 2010 012 989

(51) Int. Cl.
*B64D 11/02*    (2006.01)
*B64D 11/04*    (2006.01)
*B64D 11/00*    (2006.01)

(52) U.S. Cl.
CPC ............ *B64D 11/02* (2013.01); *B64D 11/0007* (2013.01); *B64D 11/04* (2013.01); *B64D 2011/0046* (2013.01); *Y02T 50/46* (2013.01)

(58) Field of Classification Search
CPC .... B64D 11/04; B64D 11/02; B64D 11/0007; B64D 11/00; B64D 2011/0046
USPC ................................. 244/118.1, 118.5, 129.1
See application file for complete search history.

(56) References Cited

U.S. PATENT DOCUMENTS 5,474,260 A    12/1995   Schwertfeger
6,007,025 A  * 12/1999   Coughren et al. ......... 244/118.5
(Continued)

FOREIGN PATENT DOCUMENTS

CN    201147000      11/2008
DE    43 00 877       7/1994
(Continued)

OTHER PUBLICATIONS

Ruhrmann et al., DE 102007029677 A1, Jan. 22, 2009. Machine translation from Espacenet.com.*

(Continued)

*Primary Examiner* — Timothy D Collins
*Assistant Examiner* — Richard R Green
(74) *Attorney, Agent, or Firm* — Dickinson Wright PLLC

(57) ABSTRACT

A sanitary module arrangement configured for installation in an aircraft cabin includes a sanitary module, the interior of which is separated by a partition wall from an area of the aircraft cabin adjacent to the sanitary module. A sanitary appliance and a first trolley parking place to accommodate at least one trolley configured for holding supplies for the passengers in the aircraft cabin are provided in the interior of the sanitary module. A second trolley parking place for accommodating at least one trolley configured for holding supplies for the passengers in the aircraft cabin is provided adjacent to an outer face of the partition wall outside the sanitary module. A trolley fastening device comprises a holder system for detachably fastening a trolley parked at the second trolley parking place, wherein the holder system includes a holder attached to the outer face of the partition wall.

16 Claims, 7 Drawing Sheets

(56) References Cited

U.S. PATENT DOCUMENTS

Figure 1:
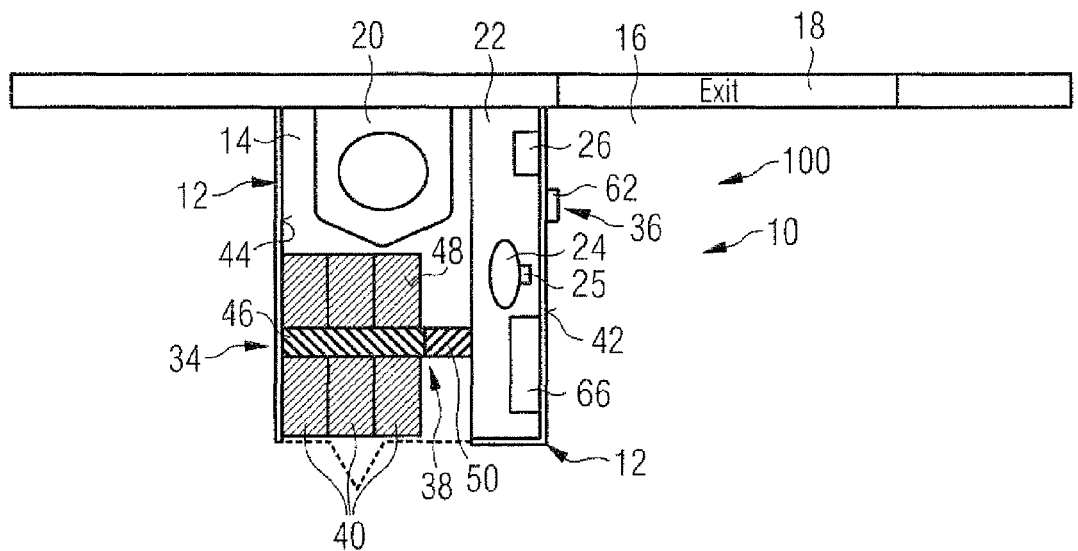

| | | |
|---|---|---|
| 7,100,872 B2 | 9/2006 | Quan |
| 2005/0230539 A1 | 10/2005 | Quan |
| 2008/0001031 A1 | 1/2008 | Doebertin |
| 2010/0181425 A1 | 7/2010 | Guering |

FOREIGN PATENT DOCUMENTS

| | | |
|---|---|---|
| DE | 10 2006 023 047 | 11/2001 |
| DE | 10 2007 029 677 | 1/2009 |
| EP | 0 850 833 | 1/1998 |
| EP | 1 655 172 | 5/2006 |
| WO | 2009/004217 | 1/2009 |

OTHER PUBLICATIONS

International Search Report dated Oct. 18, 2011.
"DASELL Cabin Interiors, Customization, Lavatories," XP-002487472, Internet Citation, Jul. 8, 2007, 2 pages total.
Chinese Office Action dated Jul. 4, 2014.

* cited by examiner

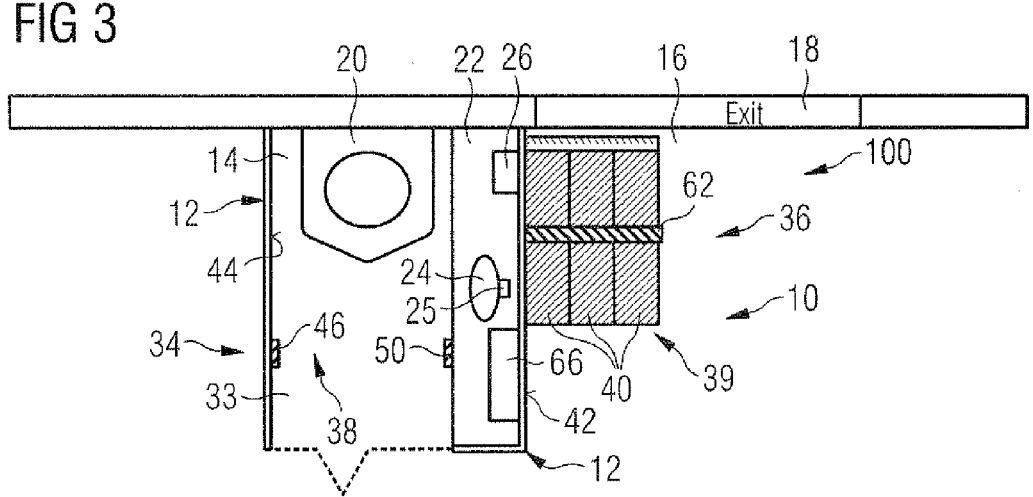
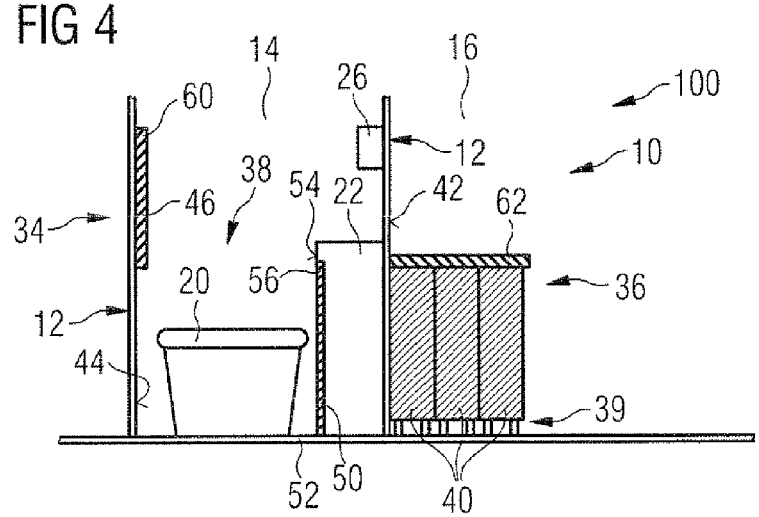
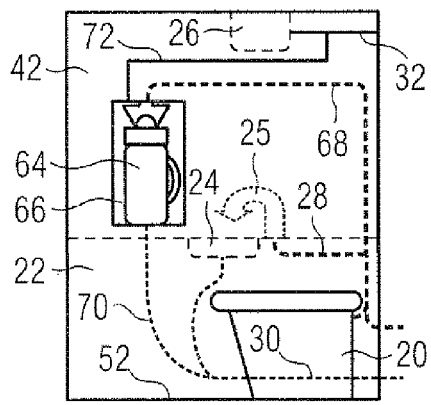

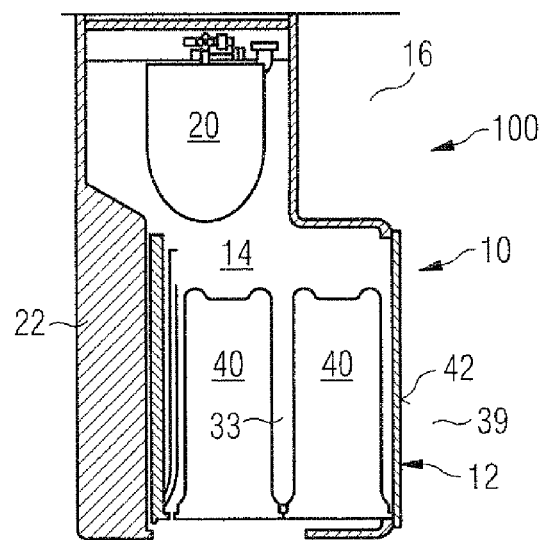
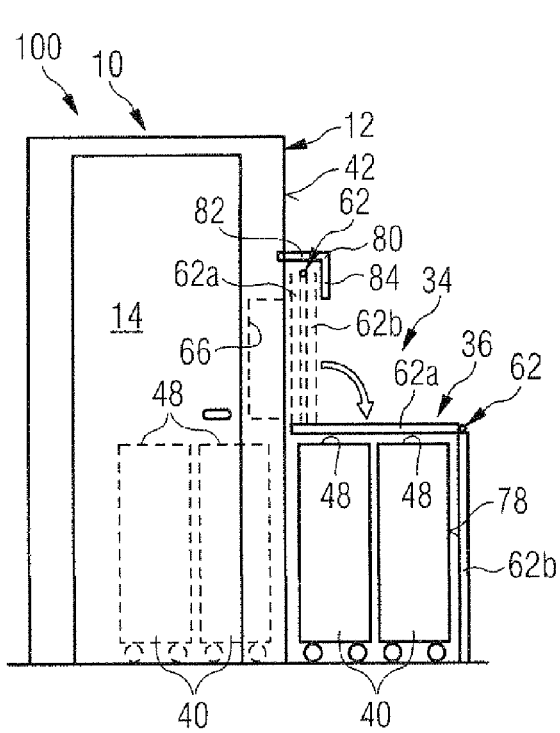
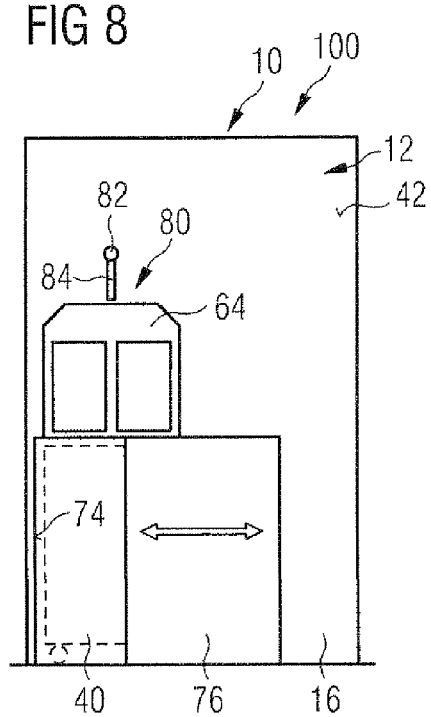

SANITARY MODULE ARRANGEMENT FOR INSTALLATION IN AN AIRCRAFT CABIN

The invention relates to a sanitary module arrangement provided for installation in an aircraft cabin, to an aircraft equipped with such a sanitary module arrangement and to a method for operating such an aircraft.

Modern commercial aircraft are usually equipped with galleys with full galley functionality. An aircraft galley is described, for example, in DE 10 2006 023 047 A1. On short-haul flights of the low cost segment, however, the passengers are frequently offered only a reduced service, that is to say just drinks and/or small snacks are distributed to the passengers. The drinks and/or snacks to be served to the passengers can be accommodated in a few trolleys. Galleys equipped with ovens, cool boxes, drink preparation appliances and sufficient stowage space for accommodating trolleys filled with a variety of service products are unnecessary for providing this reduced service.

The object on which the invention is based is to specify a sanitary module arrangement which enables reduction of the installation space requirement of a galley in an aircraft cabin. Furthermore, the object on which the invention is based is to provide an aircraft equipped with such a sanitary module arrangement and a method for operating such an aircraft.

This object is achieved by a sanitary module arrangement having the features of Claim 1, an aircraft having the features of Claim 14 and a method for operating an aircraft having the features of Claim 15.

A sanitary module arrangement provided for installation in an aircraft cabin comprises a sanitary module, the interior of which is separated by a boundary wall from a region of the aircraft cabin adjacent to the sanitary module. A section of the region of the aircraft cabin adjacent to the sanitary module is preferably a cabin region in front of an exit, or another cabin region, in which no passenger seats or other fittings are provided. A sanitary fitment, such as for example a toilet, is arranged in the interior of the sanitary module. Furthermore, a washbasin with a water tap, a mirror and/or a monument configured in the form of a cabinet for accommodating toilet paper, paper towels or the like can be provided in the interior of the sanitary module.

Furthermore, a first trolley parking place for accommodating at least one trolley suitable for holding supply goods for the passengers in the aircraft cabin is provided in the interior of the sanitary module. The sanitary module arrangement according to the invention furthermore comprises a second trolley parking place, provided adjacent to an outer surface of the boundary wall, for accommodating at least one trolley suitable for holding supply goods for the passengers in the aircraft cabin outside the sanitary module. A trolley fastening device comprises a holder system for detachably fastening a trolley parked in the second trolley parking place, the holder system having a holder attached to the outer surface of the boundary wall. The holder of the holder system can be attached, for example, in a region of the outer surface of the boundary wall which bounds a cabin region not occupied by passenger seats or other fittings. This cabin region can be, for example, a cabin region lying in front of an exit, or an aisle region.

The sanitary module arrangement according to the invention enables the accommodation of one trolley or a plurality of trolleys outside an aircraft galley. During takeoff and landing, i.e. during the flight phases in which the sanitary module is not available for use by the passengers for safety reasons anyway, the first trolley parking place in the interior of the sanitary module is available for accommodating one or more trolleys. When the aircraft is at cruising altitude, by contrast, the second trolley parking place provided adjacent to the outer surface of the boundary wall can be utilised for accommodating the trolley(s). The aircraft galley can thereby be designed considerably more space-savingly. If further appliances, such as for example ovens, cool boxes, etc. which are present in the aircraft galley, are not required, for example in aircraft used only on short-haul flights, the aircraft galley can even be completely dispensed with. In any case, a weight and installation-space saving is possible, and the installation space saved can be utilised, for example, for the installation of additional seats.

When a trolley is parked in the second trolley parking place, the holder system of the trolley fastening device ensures a secure fastening of the trolley in its position in the second trolley parking place, until the trolley is actually required to supply the passengers with service products. A holder system having a holder attached to the outer surface of the boundary wall can be realised relatively inexpensively and does not necessitate any fundamental redesign of the sanitary module. It is therefore even possible in some cases to equip existing sanitary modules, installed in an aircraft cabin, with a trolley fastening device and thereby integrate it into a sanitary module arrangement according to the invention.

The holder of the holder system is preferably pivotably attached to the outer surface of the boundary wall in such a manner that the holder is pivotable between a rest position and an operating position. In its rest position, the holder preferably extends substantially parallel to the outer surface of the boundary wall. This enables a space-saving storage of the holder when the holder is not in operation. In its operating position, the holder extends, at least in sections, substantially parallel to a top surface of a trolley parked in the second trolley parking place. For example, the holder can extend in its operating position substantially perpendicularly to the outer surface of the boundary wall from the outer surface of the boundary wall. The shape of the holder is preferably adapted to the shape and number of the trolleys to be fastened to the outer surface of the boundary wall by means of the holder system. For example, the length of the holder can be chosen such that the holder overlaps the top surfaces of a desired number of trolleys parked in the second trolley parking place when the trolleys are positioned one beside the other adjacent to the outer surface of the boundary wall. The holder can be bar-shaped or plate-shaped, as required. A plate-shaped holder has the advantage that it can be utilised as a surface on which to place things and on which to work when it extends in its operating position substantially perpendicularly to the outer surface of the boundary wall from the outer surface of the boundary wall.

The holder of the holder system can furthermore comprise a first section and a second section articulatedly connected to the first section. A holder comprising two sections can likewise be pivotably attached to the outer surface of the boundary wall in such a manner that the holder is pivotable between a rest position and an operating position. When the holder is in its rest position, the first and the second section of the holder preferably extend substantially parallel to the outer surface of the boundary wall, enabling a space-saving storage of the holder in its rest position. When the holder is, by contrast, in its operating position, the first section of the holder extends, at least in sections, substantially parallel to a top surface of a trolley parked in the second trolley parking place. For example, the first section of the holder in its operating position can extend substantially perpendicularly to the outer surface of the boundary wall from the outer surface of the boundary wall.

The shape of the first holder section is preferably adapted to the shape and number of the trolleys to be fastened to the outer surface of the boundary wall by means of the holder system. For example, the length of the first holder section can be chosen such that the first holder section overlaps the top surfaces of a desired number of trolleys parked in the second trolley parking place when the trolleys are positioned one beside the other adjacent to the outer surface of the boundary wall. In the case of a holder provided with two sections, preferably at least the first holder section is plate-shaped, in order to enable utilisation of the first holder section as a surface on which to place things and on which to work when the holder is in its operating position.

The second section of the holder in its operating position extends, by contrast, preferably, at least in sections, substantially parallel to a lateral surface, facing away from the boundary wall, of the trolley parked in the second trolley parking place. In other words, when the holder is in its operating position, the holder overlaps the trolley parked in the second trolley parking place and thus ensures a secure fixing of the trolley in its position in the second trolley parking place.

If desired, the holder can be provided with a connecting device which is configured to cooperate with a complementary connecting device which is provided, for example, in the region of the top surface or a side wall of a trolley parked in the second trolley parking place. Such a connecting system can ensure a secure connection of the holder to a trolley parked in the second trolley parking place.

The holder system preferably furthermore comprises a latching mechanism for latching the holder in its rest position. The latching mechanism can be mounted, for example, on the outer surface of the boundary wall and comprise a fastening section extending substantially perpendicularly to the outer surface of the boundary wall from the outer surface of the boundary wall. A latch can be fastened to the fastening section so as to be pivotable between a latching position and an unlatching position. Preferably, the latch extends substantially parallel to the outer surface of the boundary wall. In its latching position, the latch is then positioned such that the latching mechanism overlaps the holder, arranged parallel to the outer surface of the boundary wall, and keeps it in its position. In this case, a surface of the holder facing away from the outer surface of the boundary wall can cooperate with the latch. By pivoting the latch upwards into its unlatching position, by contrast, the holder is released, i.e. the surface of the holder facing away from the outer surface of the boundary wall no longer cooperates with the latch, so that the holder can be pivoted from its rest position into its operating position.

In the boundary wall of the sanitary module there can be formed a closable opening, through which a trolley can be displaced between the first trolley parking place in the interior of the sanitary module and the second trolley parking place provided adjacent to an outer surface of the boundary wall. The shape and size of the opening are preferably adapted to the shape and size of the trolleys which are to be displaced through the opening between the first trolley parking place and the second trolley parking place. In such a configuration of the sanitary module, it is no longer necessary to utilise the door of the sanitary module in order to displace trolleys between the first trolley parking place and the second trolley parking place. The shape and size of the door and also the design of the cabin region in front of the door then no longer have to be made so as to allow a repositioning of the trolleys through the door. Furthermore, the inner region of the sanitary module can be designed more flexibly, since it is no longer necessary to keep the door clear so that a trolley can be pushed through the door. The opening formed in the boundary wall of the sanitary module can be closable by any suitable closing device, it being possible for the closing device to be configured in the form of a flap pivotable about an axis, a sliding door or the like, as required.

In a preferred embodiment of the sanitary module arrangement according to the invention the holder of the holder system is pivotably attached to the outer surface of the boundary wall such that it covers the opening formed the boundary wall in a position of rest when the trolley is parked in the first parking place, and such that it extends substantially parallel to a top surface of a trolley parked in the second trolley parking place in an operating position. Beside its holding function the holder has the further functions to cover the opening formed the boundary wall in its position of rest and to provide a surface on which to place things and on which to work in its operating position.

An attachment protrusion may be formed on a surface of the holder which is adapted to interact with a lateral surface, facing away from the boundary wall, of the trolley parked in the second trolley parking place. The attachment protrusion is lightweight an easy to manufacture, but provides for a secure attachment of a trolley parked in the second trolley parking place, even in case of turbulences.

The holder system may further comprise a latching mechanism for latching a trolley parked in the second trolley parking place in its position. Preferably, the latching mechanism is accessible from two opposing sides of the holder. For example, the further latching mechanism may comprise a first and a second latch device which are attached at opposing sides of the holder. When the trolley is parked in the second trolley parking place, i.e. is arranged outside the sanitary module adjacent to the outer surface of the boundary wall, each of the first and the second latching device may interact with a complementary latching device attached to the top surface of the trolley in a region of a front wall and a rear wall, respectively, of the trolley. As a result, the trolley is securely latched in its position, wherein it is, however, possible to release the trolley from to opposing sides of the holder.

The sanitary module arrangement according to the invention can furthermore comprise a trolley housing for accommodating at least one trolley. The trolley housing preferably comprises a top plate, a first side wall extending substantially perpendicularly to the top plate, and a second side wall opposite the first side wall. If the trolley housing is provided for accommodating a plurality of trolleys, it can also comprise a partition wall or a plurality of partition walls which extends/extend substantially parallel to the side walls, and divides/divide the trolley housing into a plurality of compartments suitable for accommodating one trolley each. The first side wall of the trolley housing can be configured to close the opening formed in the boundary wall when the trolley housing accommodates a trolley parked in the first trolley parking place. Furthermore, the second side wall of the trolley housing can be configured to close the opening formed in the boundary wall when the trolley housing accommodates a trolley parked in the second trolley parking place.

A trolley housing so designed forms a kind of "drawer" which can be pulled out of the sanitary module through the opening formed in the boundary wall in order to move a trolley or plurality of trolleys between the first trolley parking place and the second trolley parking place. If desired, a guide device, for example a rail or the like, can be provided in the interior of the sanitary module and/or in the cabin region adjacent to the sanitary module, which device guides the displacement of the trolley housing through the opening formed in the boundary wall.

In a variant of the sanitary module arrangement according to the invention of even simpler design, a trolley is formed such that its first side wall closes the opening formed in the boundary wall when the trolley is parked in the first trolley parking place. A second side wall of the trolley can then close the opening formed in the boundary wall when the trolley is parked in the second trolley parking place.

Preferably, the trolley housing comprises a plurality of rollers which enable the trolley housing to move through the opening formed in the boundary wall. Furthermore, the trolley housing is preferably not provided with a bottom plate, but merely with side walls, a top plate and partition walls, where appropriate. The rollers which are present on a bottom plate of a trolley anyway can thus also be utilised for moving the trolley when the trolley is accommodated in the trolley housing and is to be moved through the opening formed in the boundary wall between the first and the second trolley parking place. The rollers of the trolley housing are preferably fastened to an edge section of the side walls and/or of the partition walls of the trolley housing which faces a floor of the aircraft cabin. Such a configuration enables a simple and lightweight design of the trolley housing.

The holder of the holder system can furthermore comprise at least one latch device attached to the outer surface of the boundary wall. The latch device can be configured to cooperate with an outer surface of the first side wall of the trolley housing when the trolley housing accommodates a trolley parked in the first trolley parking place. The latch device then prevents the trolley housing from moving undesirably through the opening formed in the boundary wall. Furthermore, the latch device can be configured to cooperate with a complementary latch device, formed in the top plate of the trolley housing, when the trolley housing accommodates a trolley parked in the second trolley parking place. The complementary latch device formed in the top plate of the trolley housing can be designed, for example, in the form of a cutout formed in the top plate of the trolley housing.

If a trolley is designed such that its first side wall closes the opening formed in the boundary wall when the trolley is parked in the first trolley parking place, and that its second side wall closes the opening formed in the boundary wall when the trolley is parked in the second trolley parking place, the latch device can also be configured to cooperate with an outer surface of the first side wall of the trolley when the trolley is parked in the first trolley parking place. The latch device then prevents the trolley from moving undesirably through the opening formed in the boundary wall. Furthermore, the latch device can be configured to cooperate with a complementary latch device, formed in the top surface of the trolley, when the trolley is parked in the second trolley parking place. The complementary latch device formed in the top surface of the trolley can be designed, for example, in the form of a cutout formed in the top surface of the trolley.

The trolley fastening device can furthermore comprise a further holder system for detachably fastening at least one trolley in the interior of the sanitary module. Preferably, the further holder system comprises a first holder attached to an inner surface of the boundary wall. In principle, the first holder can be attached in any region of the inner surface of the boundary wall. Preferably, however, the first holder is mounted in the region of an inner surface of a side wall section of the boundary wall not provided with a door opening, for example opposite a washbasin, so that the trolley can be positioned immediately adjacent to the inner surface of the boundary wall and fixed in this position. Additionally or alternatively to this, the further holder system of the trolley fastening device can comprise a second holder which is attached to a floor of the sanitary module and/or a monument arranged in the interior of the sanitary module. A further holder system comprising two holders enables a particularly secure fastening of the trolley.

The first holder of the further holder system can be pivotably attached to the inner surface of the boundary wall in such a manner that the first holder is pivotable between a rest position and an operating position. In its rest position, the first holder extends preferably substantially parallel to the inner surface of the boundary wall. This enables a space-saving stowage of the first holder when the first holder is not required for fastening a trolley in the interior of the sanitary module. In its operating position, by contrast, the first holder is preferably configured to extend substantially parallel to a top surface of a trolley detachably fastened in the interior of the sanitary module by means of the further holder system. For example, the first holder can extend in its operating position substantially perpendicularly to the inner surface of the boundary wall from the inner surface of the boundary wall.

The shape of the first holder is preferably adapted to the shape and number of the trolleys to be detachably fastened in the interior of the sanitary module by means of the further holder system. For example, the length of the first holder is preferably chosen such that the first holder in its operating position overlaps the top surfaces of a desired number of trolleys provided for accommodation in the interior of the sanitary module when the trolleys are positioned one beside the other in the interior of the sanitary module adjacent to the inner surface of the boundary wall. Furthermore, the first holder can be provided with a latching device which is configured to cooperate with a complementary latching device provided on the trolleys, for example in the region of their top surfaces or their lateral surfaces, when the first holder is pivoted from its rest position into its operating position.

Furthermore, the first holder of the further holder system, just like the holder of the holder system for fastening a trolley parked in the second trolley parking place, can comprise two sections articulatedly connected to one another and otherwise be designed as described above in relation to the holder system for fastening a trolley parked in the second trolley parking place. Furthermore, the further holder system, just like the holder system for fastening a trolley parked in the second trolley parking place, can comprise a latching mechanism for latching the first holder in its rest position.

The second holder of the further holder system is preferably pivotably attached to the floor of the sanitary module, and/or the monument arranged in the interior of the sanitary module, in such a manner that the second holder is pivotable between a rest position and an operating position. In its rest position, the second holder extends preferably substantially perpendicularly to the floor of the sanitary module and/or substantially parallel to a lateral surface of the monument arranged in the interior of the sanitary module. In its rest position, the second holder can then be accommodated space-savingly in the interior of the sanitary module. When the second holder is, by contrast, in its operating position, preferably a free end, i.e. an end of the second holder not connected to the floor of the sanitary module and/or the monument arranged in the interior of the sanitary module, is configured to cooperate with the second holder in its operating position and/or a lateral surface of a trolley detachably fastened in the interior of the sanitary module by means of the further holder system. The second holder thus ensures a lateral fixing of the trolley, i.e. it prevents the trolley from rolling from its position adjacent to the inner surface of the boundary wall, for example during takeoff or landing. A further latching mechanism can serve to latch the second holder in its rest position.

In a preferred embodiment, the sanitary module according to the invention furthermore comprises a drink preparation device which comprises a water connection system for supplying the drink preparation device with water. The drink preparation device can be a drink preparation device suitable for preparing tea or coffee, but also a drink preparation device for preparing cold drinks, e.g. in the form of a postmix system. The water connection system of the drink preparation device is preferably connected to a water supply system of the sanitary module for supplying the sanitary fitment with water. In the sanitary module according to the invention, the water supply system of the sanitary module which is present anyway is thus utilised for supplying the drink preparation device with water.

Preferably, the drink preparation device furthermore comprises a wastewater connection system for disposing of wastewater produced by the drink preparation device. The wastewater connection system of the drink preparation device can be connected to a wastewater disposal system of the sanitary module for disposing of wastewater produced by the sanitary fitment. Furthermore, the drink preparation device can comprise an electrical connection system for supplying the drink preparation device with electrical energy, which system is connected to an electrical supply system of the sanitary module. The electrical supply system of the sanitary module serves, for example, for supplying lighting elements or the like provided in the sanitary module with electrical energy.

The drink preparation device is preferably arranged in the region of the outer surface of the boundary wall. In such a configuration of the sanitary module according to the invention, the drink preparation device is also accessible when the sanitary module is in use. For example, the outer surface of the boundary wall can be provided with a recess for accommodating the drink preparation device. The recess is preferably formed at such a height in the boundary wall of the sanitary module that the top surface of a trolley parked in the second trolley parking place, the holder, in its operating position, of the holder system for fixing a trolley parked in the second trolley parking place, or the top plate of a trolley housing can be utilised as a surface on which to place things and on which to work.

An aircraft according to the invention comprises an above-described sanitary module arrangement.

In the case of a method according to the invention for operating an aircraft equipped with an above-described sanitary module arrangement, at least one trolley suitable for holding supply goods for the passengers in the aircraft cabin is parked in the first trolley parking place of the sanitary module arrangement during the takeoff and/or during the landing of the aircraft.

The trolley is preferably parked outside the sanitary module in the second trolley parking place adjacent to the outer surface of the boundary wall of the sanitary module when the aircraft is flying at cruising altitude.

The trolley can be fastened in its position in the first trolley parking place and/or in its position in the second trolley parking place by means of the trolley fastening device.

Figure 2:
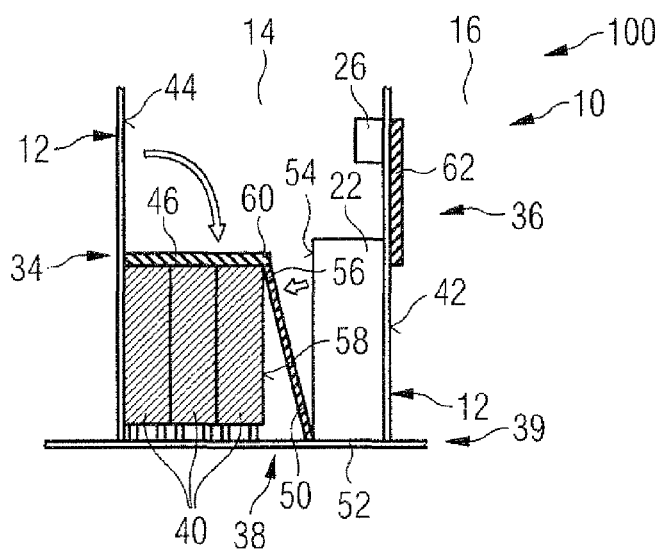
Figure 9:
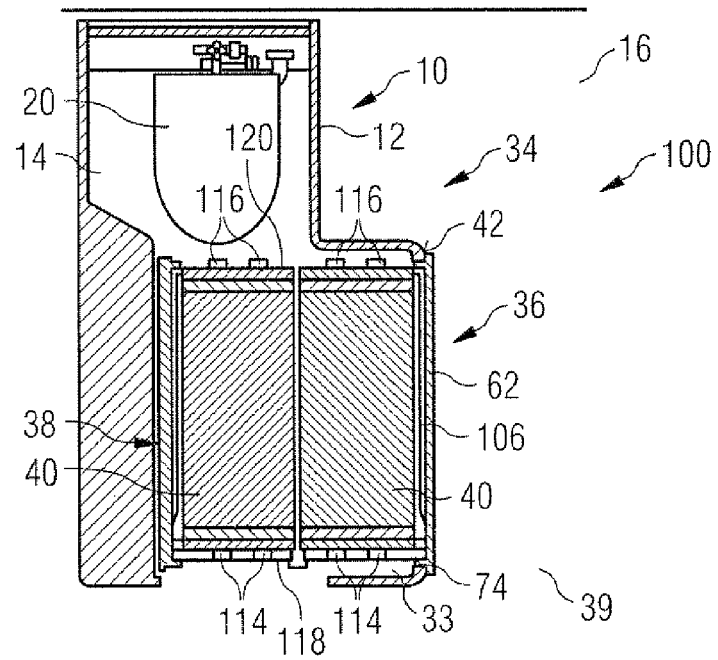
Figure 10:
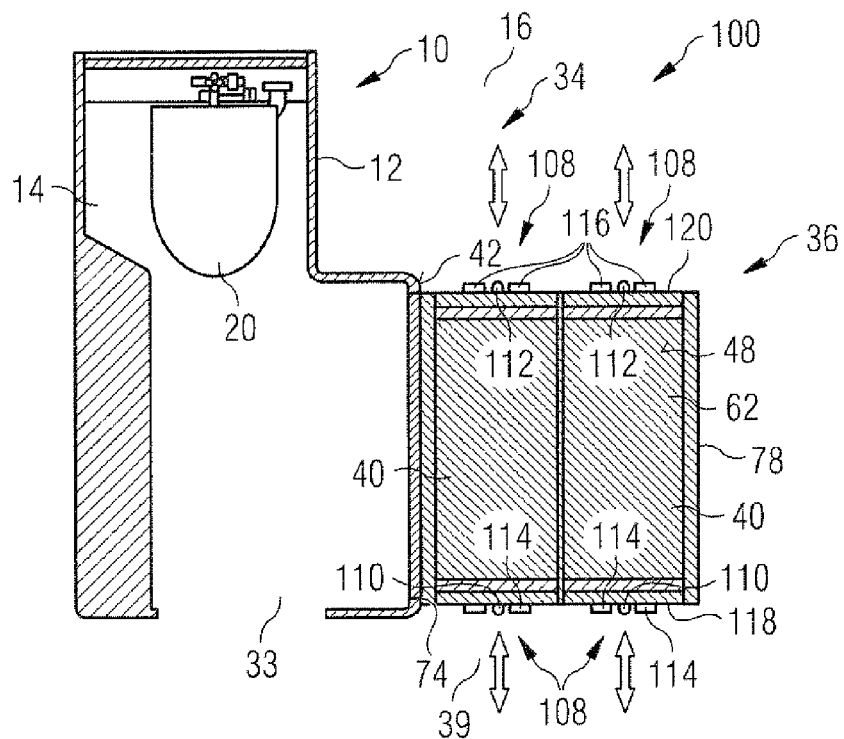
Figure 11:
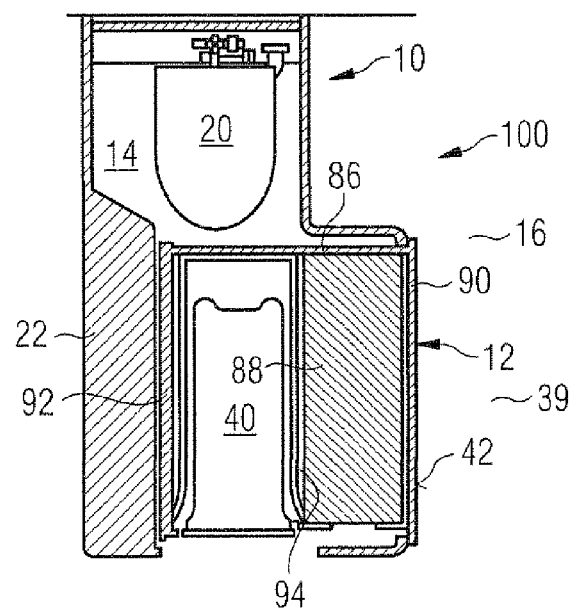
Figure 12:
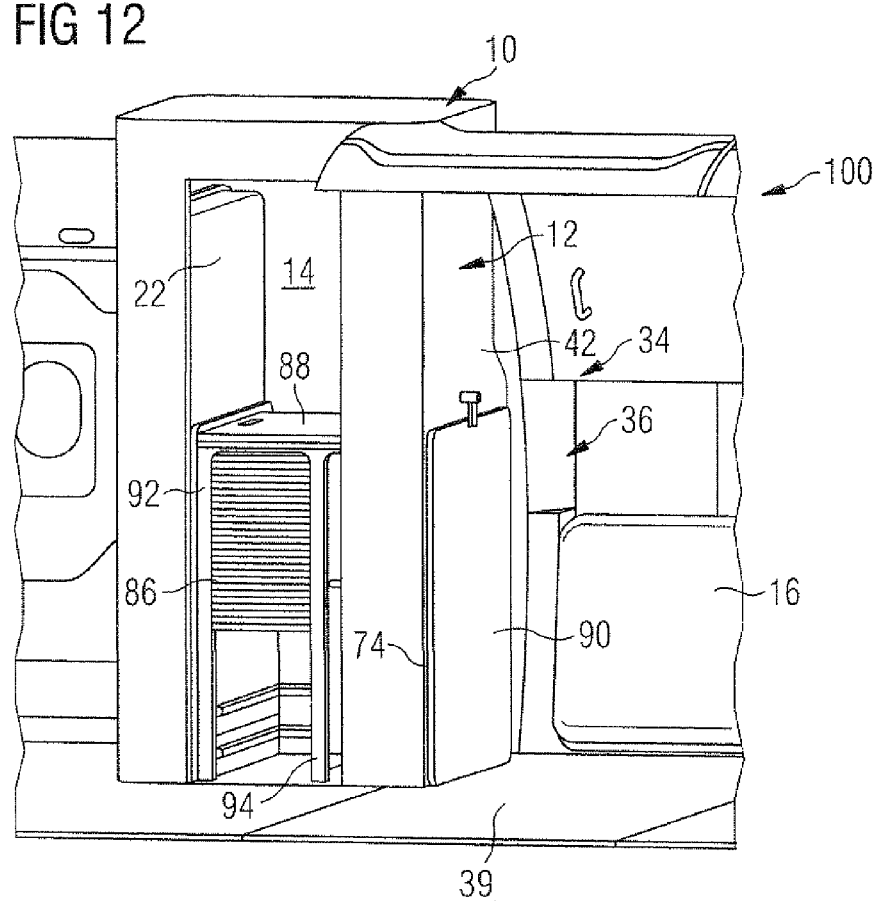
Figure 13:
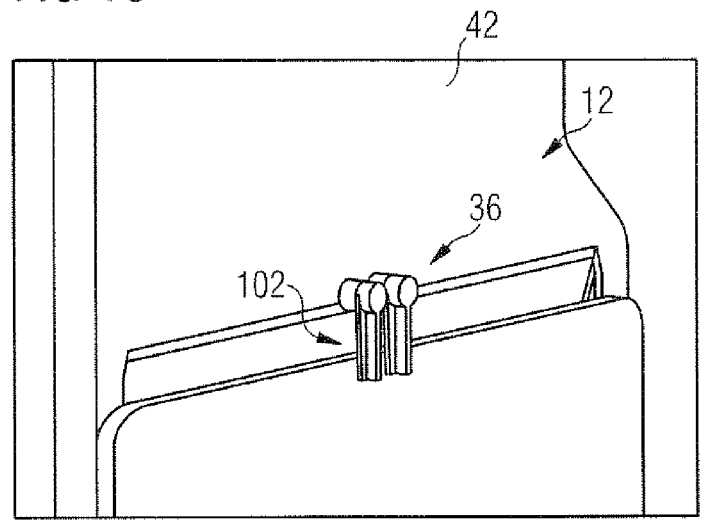
Figure 14:
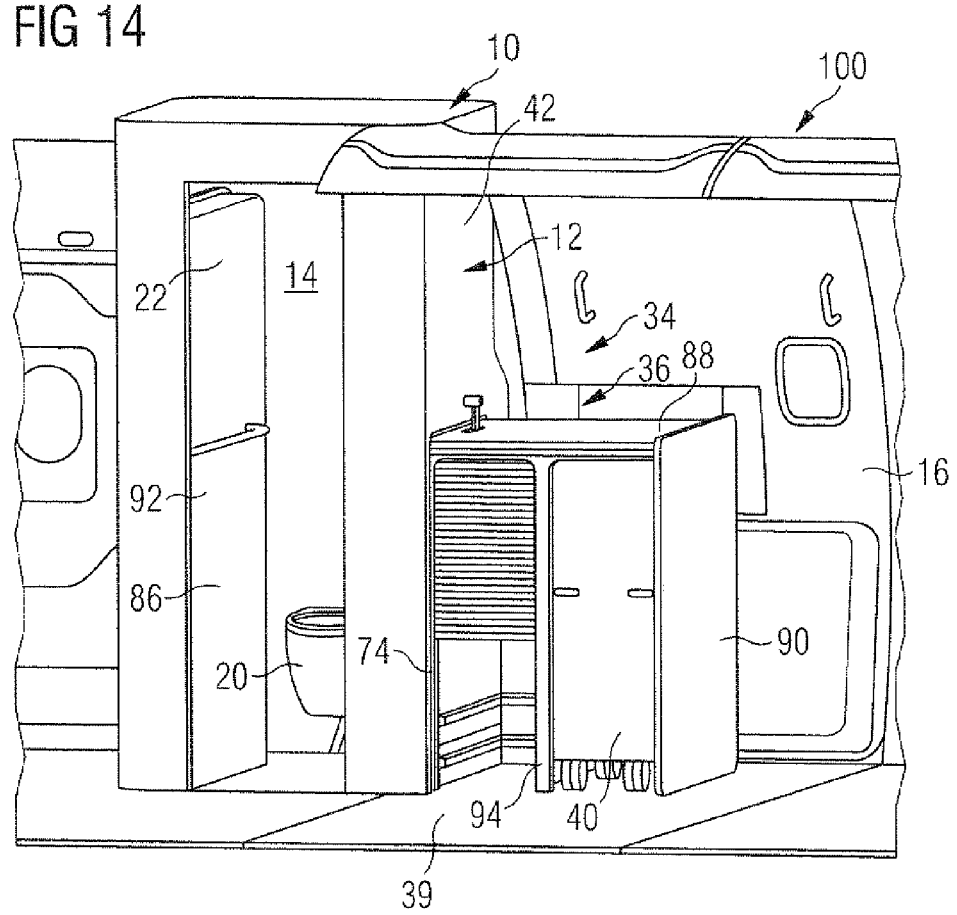
Figure 15:
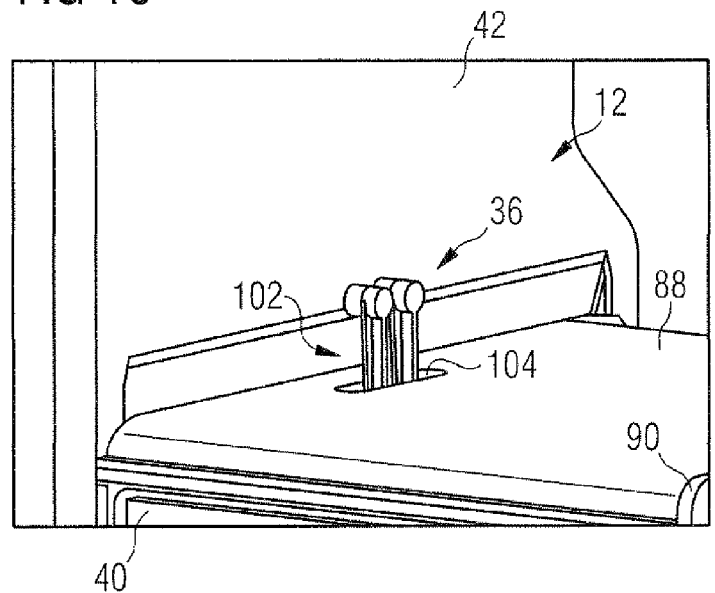
Figure 16:
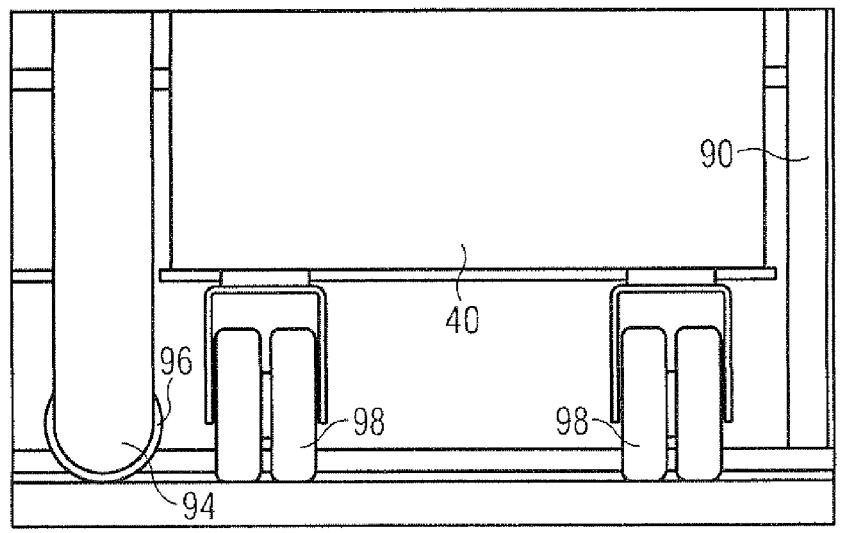

Preferred embodiments of the invention are now explained in more detail with reference to the appended schematic drawings, of which:

FIG. 1 shows a plan view of a first embodiment of a sanitary module arrangement with trolleys parked in a first trolley parking place in an interior of a sanitary module, FIG. 2 shows a side view of the sanitary module arrangement according to FIG. 1, FIG. 3 shows a plan view of the sanitary module arrangement according to FIG. 1 with trolleys parked in a second trolley parking place adjacent to an outer surface of a boundary wall of the sanitary module, FIG. 4 shows a side view of the sanitary module arrangement according to FIG. 3, FIG. 5 shows a detail view of the outer surface of the boundary wall of the sanitary module illustrated in FIGS. 1 to 4, FIG. 6 shows a plan view of a second embodiment of a sanitary module arrangement with trolleys parked in a first trolley parking place in an interior of a sanitary module, FIG. 7 shows a side view of the sanitary module arrangement according to FIG. 6 with trolleys parked in a second trolley parking place adjacent to an outer surface of a boundary wall of the sanitary module, FIG. 8 shows a further side view of the sanitary module arrangement according to FIG. 6, FIG. 9 shows a plan view of a third embodiment of a sanitary module arrangement with trolleys parked in a first trolley parking place in an interior of the sanitary module, FIG. 10 shows a plan view the sanitary module arrangement according to FIG. 9 with trolleys parked in a second trolley parking place adjacent to an outer surface of a boundary wall of the sanitary module, FIG. 11 shows a plan view of a fourth embodiment of a sanitary module arrangement with trolleys accommodated in a trolley housing and parked in a first trolley parking place in an interior of a sanitary module, FIG. 12 shows a three-dimensional view of the sanitary module arrangement according to FIG. 11, FIG. 13 shows a detail view of the sanitary module arrangement according to FIG. 12, which illustrates a latch device attached to an outer surface of a boundary wall of the sanitary module, FIG. 14 shows a three-dimensional view of the sanitary module arrangement according to FIG. 11 with trolleys accommodated in a trolley housing and parked in a second trolley parking place adjacent to an outer surface of a boundary wall of the sanitary module, FIG. 15 shows a detail view of the sanitary module arrangement according to FIG. 14, which illustrates the latch device attached to the outer surface of the boundary wall of the sanitary module, in the state when latched to a complementary latch device in a top plate of the trolley housing, and FIG. 16 shows a detail view of the sanitary module arrangement according to FIG. 14, which illustrates rollers attached to side walls and also to a partition wall of the trolley housing.

A first embodiment of a sanitary module arrangement 100 with a sanitary module 10 is illustrated in FIGS. 1 to 5 in the state when installed in an aircraft cabin. An interior 14 of the sanitary module 10 is separated by a boundary wall 12 from a region 16 of the aircraft cabin adjacent to the sanitary module 10. A section of the cabin region 16 in front of an exit 18 of the aircraft cabin is not occupied by passenger seats or other fittings.

A toilet 20 and a monument 22 in the form of a cabinet are situated in the interior 14 of the sanitary module 10. A washbasin 24 and a water tap 25 are integrated into the monument 22 in the form of a cabinet. Furthermore, a lighting element 26 is present. As can be seen from FIG. 5, the sanitary module 10 comprises a water supply system 28, which serves to connect the water tap 25 and the toilet 20 to a central water supply system of the aircraft. Furthermore, a wastewater disposal system 30 is present, which serves to connect the washbasin 24 and the toilet 20 to a central wastewater disposal system of the aircraft. Finally, an electrical supply system 32 is present, which serves to connect the lighting element 26 to a central electrical supply system of the aircraft.

A first trolley parking place 33 is provided in the interior 14 of the sanitary module 10. A trolley fastening device 34 comprises a holder system 36 and a further holder system 38. The holder system 36 serves for detachably fastening three trolleys 40, suitable for holding supply goods for the passengers in the aircraft cabin, to an outer surface 42 of the boundary wall 12 when the trolleys 40 are parked in a second trolley parking place 39 adjacent to the outer surface 42 of the boundary wall 12 (see FIGS. 3 and 4). The further holder system 38 serves, by contrast, for detachably fixing the trolleys 40 in the first trolley parking place 33 in the interior 14 of the sanitary module 10 (see FIGS. 1 and 2).

The further holder system 38 comprises a bar-shaped first holder 46 pivotably attached to an inner surface 44 of the boundary wall opposite the monument 22. In its rest position illustrated in FIGS. 3 and 4, the first holder 46 extends substantially parallel to the inner surface 44 of the boundary wall 12 and can thereby be stowed space-savingly in the interior 14 of the sanitary module 10. In its operating position illustrated in FIGS. 1 and 2, the first holder 46 extends, by contrast, substantially perpendicularly to the inner surface 44 of the boundary wall 12 from the inner surface 44 of the boundary wall 12 and overlaps top surfaces 48 of the trolleys 40.

A likewise bar-shaped second holder 50 of the further holder system 38 is pivotably fastened to a floor 52 of the sanitary module 10 adjacent to the monument 22. In its rest position shown in FIGS. 3 and 4, the second holder 50 extends substantially perpendicularly to the floor 52 of the sanitary module 10 and substantially parallel to a lateral surface 54 of the monument 22 opposite the inner surface 44 of the boundary wall 12. In its operating position illustrated in FIGS. 1 and 2, by contrast, a free end 56 of the second holder 50 cooperates with a lateral surface 58 of one of the trolleys 40 fastened in the interior of the sanitary module 10 by means of the further holder system 38. Furthermore, the free end 56 of the second holder 50 is in engagement with a free end 60 of the first holder 46.

The trolleys 40 are fixed laterally in their position in the interior 14 of the sanitary module 10 by the second holder 50, i.e. the second holder prevents the trolleys 40 from coming away from their position adjacent to the inner surface 44 of the boundary wall 12. The second holder 50, as well as the first holder 46, can be provided with a latching device which is configured to cooperate with a complementary latching device provided on the trolleys 40, in order to fix the first holder 46 and/or the second holder 50 to the trolleys 50. Furthermore, it is conceivable to equip the holders 46, 50 with mutually complementary latching devices which enable a connection of the two holders 46, 50 to another.

The holder system 36 of the sanitary module 10 comprises a bar-shaped holder 62 which is pivotably attached to the outer surface 42 of the sanitary module 10. In its rest position illustrated in FIGS. 1 and 2, the holder 62 extends substantially parallel to the outer surface 42 of the boundary wall 12, enabling a space-saving stowage of the holder 62. In its operating position illustrated in FIGS. 3 and 4, the holder 62 extends, by contrast, parallel to the top surfaces 48 of the trolleys 40 detachably fastened to the outer surface 42 of the sanitary module 10 by means of the second holder system 38, i.e. substantially perpendicularly to the outer surface 42 of the boundary wall 12 from the outer surface 42 of the boundary wall. If desired, the holder 62, in a similar manner to the first holder 46 of the further holder system 38, can be provided with a latching device which is configured to cooperate with a complementary latching device provided in the region of the top surfaces 48 of the trolleys 40, in order to fix the trolleys 40 securely to the holder 62.

The sanitary module 10 furthermore comprises a drink preparation device 64 for preparing tea or coffee. The drink preparation device 64 is arranged in a recess 66, which is formed in the region of the outer surface 42 of the boundary wall 12. The drink preparation device 64 is thus also accessible when the sanitary module 10 is in use.

As can be seen from FIG. 5, the drink preparation device comprises a water connection system 68, which is connected to the water supply system 28 of the sanitary module 10 in order to supply the drink preparation device 64 with fresh water. Furthermore, a wastewater connection system 70 of the drink preparation device 64 is connected to the wastewater disposal system 30 of the sanitary module 10. Finally, the drink preparation device 64 is connected to the electrical supply system of the sanitary module 10 via an electrical connection system 72.

During takeoff and landing of the aircraft, the trolleys 40 can be accommodated in the interior 14 of the sanitary module 10, as shown in FIGS. 1 and 2. In this case, the further holder system 38 secures the trolleys in their position. To ensure the hygiene standards required, the foodstuffs stored in the trolleys 50 are packaged and/or shrink-wrapped. Furthermore, it is conceivable, additionally or alternatively to this, to seal the trolleys 40 themselves, for example by means of a suitable protective film.

After takeoff, the trolleys 40 can be removed from the interior 14 of the sanitary module 10 and fastened in their position at the outer surface 42 of the boundary wall 12 by means of the holder system 36 until the trolleys are finally required for supplying the passengers with the foodstuffs stored in the trolleys 40.

A second embodiment of a sanitary module arrangement 100, illustrated in FIGS. 6 to 8, differs from the configuration shown in FIGS. 1 to 5 firstly in that there is formed in the boundary wall 12 an opening 74, through which the trolleys 40 can be moved between the first trolley parking place 33 in the interior 14 of the sanitary module 10 and the second trolley parking place 39 adjacent to the outer surface 42 of the boundary wall 12. As a result, it is no longer necessary to push the trolleys 40 through a door opening of the sanitary module 10. The opening 74 formed in the boundary wall 12 can be closed by a sliding door 76.

Furthermore, the second embodiment of a sanitary module arrangement 100 according to FIGS. 6 to 8 comprises a holder system 36 with a holder 62 having two plate-shaped sections 62a, 62b. The two sections 62a, 62b of the holder 62 are articulatedly connected to one another. The holder 62 comprising two sections 62a, 62b is pivotably attached to the outer surface 42 of the boundary wall 12 in such a manner that the holder 62 is pivotable between a rest position and an operating position. When the holder 62 is in its rest position (see FIG. 7, dashed lines), the first and the second section 62a, 62b of the holder 62 extend substantially parallel to one another and parallel to the outer surface 42 of the boundary wall 12.

When the holder 62 is, by contrast, in its operating position (see FIG. 7, continuous lines), the first section 62a of the holder 62 extends parallel to the top surfaces 48 of the trolleys 40 parked in the second trolley parking place 39, i.e. perpendicularly to the outer surface 42 of the boundary wall 12 from the outer surface 42 of the boundary wall 12. The second section 62b of the holder 62 in its operating position extends, by contrast, parallel to a lateral surface 78, facing away from the boundary wall 12, of the trolleys 40 parked in the second trolley parking place 39. In other words, when the holder 62 is in its operating position, the holder 62 overlaps the trolleys 40 parked in the second trolley parking place 39 and thus ensures a secure fixing of the trolleys 40 in their position in the second trolley parking place 39.

When the holder 62 is in its operating position, the plate-shaped first holder section 62a can be utilised as surface on which to place things. For this purpose, the recess 66 accommodating the drink preparation device 64 is arranged at such a height in the outer surface 42 of the boundary wall 12 that convenient use of the holder section 62a as a surface on which to place things and on which to work is possible.

The holder system 36 furthermore comprises a latching mechanism 80 for latching the holder 62 in its rest position. The latching mechanism 80 is mounted on the outer surface 42 of the boundary wall 12 and comprises a fastening section 82 extending substantially perpendicularly to the outer surface 42 of the boundary wall 12 from the outer surface 42 of the boundary wall 12. A latch 84 is fastened to the fastening section 82 so as to be pivotable between a latching position and an unlatching position. The latch 84 extends substantially parallel to the outer surface 42 of the boundary wall 12. In its latching position (see FIG. 7), the latch 84 is positioned such that the latching mechanism 80 overlaps the holder 62, arranged parallel to the outer surface 42 of the boundary wall 12, and keeps it in its position. In this case, a surface of the holder 62 facing away from the outer surface 42 of the boundary wall 12 cooperates with the latch 84. By pivoting the latch 84 upwards into its unlatching position, by contrast, the holder 62 is released, i.e. the surface of the holder 62 facing away from the outer surface 42 of the boundary wall 12 no longer cooperates with the latch 84, so that the holder 62 can be pivoted from its rest position into its operating position.

Otherwise, the construction and functioning of the sanitary module arrangement 100 according to FIGS. 6 to 8 correspond to the construction and functioning of the system illustrated in FIGS. 1 to 5. In particular, the sanitary module arrangement 100 according to FIGS. 6 to 8 can also comprise a further holder system 38 for fixing the trolleys 40 in the first trolley parking place 33.

A third embodiment of a sanitary module arrangement 100, illustrated in FIGS. 9 and 10, differs from the configuration shown in FIGS. 6 to 8 in that the holder 62 of the holder system 36 is pivotably attached to the outer surface 42 of the boundary wall 12 such that it covers the opening 74 formed the boundary wall 12 in a position of rest when the trolleys 40 are parked in the first parking place 33 (see FIG. 9). In an operating position the holder 62 extends substantially parallel to a top surface 48 of the trolleys parked in the second trolley parking place 39 (see FIG. 10).

An attachment protrusion 106 is formed on a surface of the holder 62 which is adapted to interact with a lateral surface 78, facing away from the boundary wall 12, of the trolleys 40 parked in the second trolley parking place 39. The holder system 36 further comprises a latching mechanism 108 for latching the trolleys 40 parked in the second trolley parking place 39 in their position. Specifically, a latching mechanism 108 is provided for each of the trolleys 40.

The latching mechanism 108 comprises a first and a second latch device 110, 112 which are attached at opposing sides of the holder 62. When the trolleys 40 are parked in the second trolley parking place 39 each of the first and the second latching device 110, 112 interacts with a complementary latching device 114, 116 attached to the top surface 48 of the trolleys 40 in a region of a front wall 118 and a rear wall 120, respectively, of the trolleys 40. As a result, the trolley is securely latched in its position, wherein it is, however, possible to release the trolley from to opposing sides of the holder.

Otherwise, the construction and functioning of the sanitary module arrangement 100 according to FIGS. 9 to 10 correspond to the construction and functioning of the system illustrated in FIGS. 6 to 8.

A fourth embodiment of a sanitary module arrangement 100, illustrated in FIGS. 11 to 16, differs from the configuration shown in FIGS. 6 to 8 by having a trolley housing 86 which is suitable for accommodating two trolleys 40 in the exemplary embodiment illustrated in FIGS. 11 to 16. The trolley housing 86 comprises a top plate 88, a first side wall 90 extending substantially perpendicularly to the top plate 88, and a second side wall 92 opposite the first wall 90. Furthermore, a partition wall 94 is present, which extends substantially parallel to the side walls 90, 92 and divides the trolley housing 86 into a plurality of compartments suitable for accommodating one trolley 40 each.

When the trolley housing 86 is positioned in the interior 14 of the sanitary module 10 (see FIGS. 11 and 12) and accommodates trolleys 40 parked in the first trolley parking place 33, the first side wall 90 of the trolley housing 86 closes the opening 74 which is formed in the boundary wall 12 and through which the trolleys 40 can be moved between the first trolley parking place 33 and the second trolley parking place 39. When the trolley housing 86 is, by contrast, positioned outside the sanitary module 10 (see FIG. 14) and accommodates trolleys 40 parked in the second trolley parking place 39, the second side wall 92 of the trolley housing 86 closes the opening 74 formed in the boundary wall 12. The trolley housing 86 thus forms a kind of "drawer" which can be pulled out of the sanitary module 10 through the opening 74 formed in the boundary wall 12 in order to move the trolleys 40 between the first trolley parking place 33 and the second trolley parking place 39.

As can be seen in particular in FIG. 16, the trolley housing 86 comprises a plurality of rollers 96 which are fastened to an edge section, close to the floor, of the side walls 90, 92 and of the partition wall 94 of the trolley housing 86 and enable the trolley housing 86 to move through the opening 74 formed in the boundary wall 12. Furthermore, the trolley housing 86 is not provided with a bottom plate, i.e. is of downwardly open design. Rollers 98 which are present on a bottom plate of the trolleys 40 anyway can thus also be utilised for moving the trolleys 40 when the trolleys 40 are accommodated in the trolley housing 86 and are to be moved through the opening 74 formed in the boundary wall 12 between the first and the second trolley parking place 33, 39.

Furthermore, the design of the holder 62 is adapted such that the holder 62 is suitable for use with a trolley housing 86. For this purpose, the holder 62 comprises two latch devices 102 rotatably attached to the outer surface 42 of the boundary wall 12. When the trolley housing 86 accommodates trolleys 40 parked in the first trolley parking place 33, i.e. is arranged in the interior 14 of the sanitary module 10, the latch devices 102 cooperate with an outer surface of the first side wall 90 of the trolley housing 92 (see FIG. 13). The cooperation of the latch devices 102 with the first side wall 90 of the trolley housing 92 prevents the trolley housing 86 from moving undesirably through the opening 74 formed in the boundary wall 12.

When the trolley housing 86 accommodates, by contrast, trolleys 40 parked in the second trolley parking place 39, i.e. is arranged outside the sanitary module 10 adjacent to the outer surface 42 of the boundary wall 12, the latch devices 102 cooperate with a complementary latch device 104 formed in the top plate 88 of the trolley housing 86 (see FIG. 15). The complementary latch device 104 formed in the top plate 88 of the trolley housing 86 is designed in the form of a cutout formed in the top plate 88 of the trolley housing 86. The cooperation of the latch devices 102 with the complementary latch device 104 formed in the top plate 88 of the trolley housing 86 results in the trolley housing 86 and thus the trolleys 40 being securely held in their position adjacent to the outer surface 42 of the boundary wall 12.

Otherwise, the construction and functioning of the sanitary module arrangement 100 according to FIGS. 11 to 16 correspond to the construction and functioning of the system illustrated in FIGS. 6 to 8. In particular, the sanitary module arrangement 100 according to FIGS. 11 to 16 can also comprise a drink preparation device for preparing tea or coffee which is arranged in a recess formed in the region of the outer surface 42 of the boundary wall 12. When the trolley housing 86 is arranged outside the sanitary module 10 adjacent to the outer surface 42 of the boundary wall 12, the top plate 88 of the trolley housing 86 can be utilised as a surface on which to place things and on which to work, in a similar manner to the holder 62 in the system illustrated in FIGS. 6 to 8.

The invention claimed is:

1. Sanitary module arrangement for installation in an aircraft cabin, having:
   a sanitary module, the interior of which is separated by a boundary wall from a region of the aircraft cabin adjacent to the sanitary module, wherein in the interior of the sanitary module are provided both a sanitary fitment and a first trolley parking place for accommodating at least one trolley configured for holding supply goods for the passengers in the aircraft cabin,
   a second trolley parking place, provided outside the sanitary module and adjacent to an outer surface of the boundary wall, for accommodating at least one trolley configured for holding supply goods for the passengers in the aircraft cabin, and
   a trolley fastening device which comprises a holder system for detachably fakening a trolley parked in the second trolley parking place, the holder system having a holder attached to the outer surface of the boundary wall,
   wherein the holder of the holder system comprises at least one latch device attached to the outer surface of the boundary wall, which is configured to directly engage with, at the outer surface of the boundary wall, a first side wall of a trolley housing for accommodating at least one trolley when the trolley housing accommodates a trolley parked in the first trolley parking place, and which is furthermore configured to directly engage with, at the outer surface of the boundary wall, a complementary latch device, formed in a top plate of the trolley housing, when the trolley housing accommodates a trolley parked in the second trolley parking place.

2. Sanitary module arrangement according to claim 1, wherein the holder of the holder system is pivotably attached to the outer surface of the boundary wall in such a manner that the holder is pivotable between a rest position, in which the holder extends substantially parallel to the outer surface of the boundary wall, and an operating position, in which the holder extends, at least in sections, substantially parallel to a top surface of a trolley parked in the second trolley parking place.

3. Sanitary module arrangement according to claim 1, wherein the holder of the holder system comprises a first section and a second section articulatedly connected to the first section and is pivotally attached to the outer surface of the boundary wall in such a manner that the holder is pivotable between a rest position, in which the first and the second section of the holder extend substantially parallel to the outer surface of the boundary wall, and an operating position, in which the first section of the holder extends, at least in sections, substantially parallel to a top surface of a trolley parked in the second trolley parking place, and in which the second section of the holder extends, at least in sections, substantially parallel to a lateral surface, facing away from the boundary wall, of the trolley parked in the second trolley parking place.

4. Sanitary module arrangement according to claim 2, wherein the holder system comprises a latching mechanism for latching the holder in its rest position.

5. Sanitary module arrangement according to claim 1, wherein there is formed in the boundary wall a closable opening, through which a trolley can be displaced between the first trolley parking place in the interior of the sanitary module and the second trolley parking place provided adjacent to an outer surface of the boundary wall.

6. Sanitary module arrangement according to claim 5, wherein the holder of the holder system is pivotably attached to the outer surface of the boundary wall such that it covers the opening formed the boundary wall in a position of rest when the trolley is parked in the first parking place, and such that it extends substantially parallel to a top surface of a trolley parked in the second trolley parking place in an operating position.

7. Sanitary module arrangement according to claim 6, wherein an attachment protrusion is formed on a surface of the holder which is adapted to interact with a lateral surface, facing away from the boundary wall, of the trolley parked in the second trolley parking place.

8. Sanitary module arrangement according to claim 6, wherein the holder system comprises a latching mechanism for latching a trolley parked in the second trolley parking place in its position, the latching mechanism being accessible from two opposing sides of the holder.

9. Sanitary module arrangement according to claim 7, wherein the holder system comprises a latching mechanism for latching a trolley parked in the second trolley parking place in its position, the latching mechanism being accessible from two opposing sides of the holder.

10. Sanitary module arrangement according to claim 5, wherein the first side wall extends substantially perpendicularly to the top plate, and the trolley housing comprises a second side wall opposite the first side wall, the first side wall of the trolley housing being configured to close the closable opening formed in the boundary wall when the trolley housing accommodates a trolley parked in the first trolley parking place, and the second side wall of the trolley housing being configured to close the closable opening formed in the boundary wall when the trolley housing accommodates a trolley parked in the second trolley parking place.

11. Sanitary module arrangement according to claim 10, wherein the trolley housing comprises a plurality of rollers which are fastened to an edge section of the side walls of the trolley housing.

12. Sanitary module arrangement according to claim 1, further comprising a drink preparation device, wherein, for supplying the drink preparation device with water, a water connection system of the drink preparation device is connected to a water supply system of the sanitary module for supplying the sanitary fitment with water, wherein, for disposing of wastewater produced by the drink preparation device, a wastewater connection system of the drink preparation device is connected to a wastewater disposal system of the sanitary module for disposing of wastewater produced by the sanitary fitment, and/or wherein, for supplying the drink preparation device with electrical energy, an electrical connection system of the drink preparation device is connected to an electrical supply system of the sanitary module.

13. Sanitary module arrangement according to claim 12, wherein the drink preparation device is arranged in the region of the outer surface of the boundary wall.

14. Aircraft having a sanitary module arrangement according to claim 1.

15. Method for operating an aircraft according to claim 14, in which at least one trolley configured for holding supply goods for the passengers in the aircraft cabin is parked in the first trolley parking place of the sanitary module arrangement during the takeoff and/or during the landing of the aircraft.

16. Method according to claim 14, wherein the trolley is parked in the second trolley parking place of the sanitary module arrangement when the aircraft is flying at cruising altitude.

\* \* \* \* \*